(12) United States Patent
Lilleystone

(10) Patent No.: US 7,540,936 B2
(45) Date of Patent: Jun. 2, 2009

(54) OIL/WATER SEPARATION SYSTEM

(75) Inventor: Richard Lilleystone, London (GB)

(73) Assignee: Industrial Waste Treatment Limited, Worcestershire (GB)

( * ) Notice: Subject to any disclaimer, the term of this patent is extended or adjusted under 35 U.S.C. 154(b) by 678 days.

(21) Appl. No.: 10/488,787

(22) PCT Filed: Sep. 6, 2002

(86) PCT No.: PCT/GB02/04074

§ 371 (c)(1),
(2), (4) Date: Oct. 27, 2004

(87) PCT Pub. No.: WO03/022396

PCT Pub. Date: Mar. 20, 2003

(65) Prior Publication Data

US 2005/0039860 A1 Feb. 24, 2005

(30) Foreign Application Priority Data

Sep. 7, 2001 (EP) .................................. 01307604

(51) Int. Cl.
*B01D 1/14* (2006.01)
*B01D 17/00* (2006.01)
*C02F 1/04* (2006.01)
*C02F 1/40* (2006.01)

(52) U.S. Cl. ................. 159/43.1; 159/31; 159/47.3; 165/80.3; 202/152; 203/10; 210/512.1; 210/708; 210/805; 55/399

(58) Field of Classification Search ............... 159/22, 159/31, 43.1, 47.3, DIG. 15; 210/512.1, 210/708, 805; 165/80.3, 80.4; 202/152, 202/267.1; 203/10, 86; 55/399
See application file for complete search history.

(56) References Cited

U.S. PATENT DOCUMENTS

| 1,600,762 | A | | 9/1926 | Szugs | |
|---|---|---|---|---|---|
| 3,896,635 | A | * | 7/1975 | Stewart | 62/499 |
| 3,986,936 | A | * | 10/1976 | Rush | 202/234 |
| 4,176,012 | A | * | 11/1979 | Bryant | 202/172 |
| 4,273,733 | A | * | 6/1981 | Kals | 261/151 |
| 4,375,386 | A | | 3/1983 | Windham | |
| 5,059,311 | A | * | 10/1991 | Ganz | 209/455 |
| 6,872,045 | B1 | * | 3/2005 | Weaver et al. | 415/4.2 |

FOREIGN PATENT DOCUMENTS

| EP | 0036659 | 9/1981 |
|---|---|---|
| GB | 1153318 | 5/1969 |

* cited by examiner

Primary Examiner—Virginia Manoharan

(57) ABSTRACT

An evaporator for receiving waste fluid stream and producing separate streams of an evaporated fluid and a condensate liquid for use in industrial waste treatment has a curved pathway bounded by a casing having an inlet port through which the waste fluid enters the casing. The casing defines a pathway having a flow direction therein through which the waste fluid stream flows, and within which casing the evaporated fluid is produced. The casing has a drain beneath the pathway through which the condensate passes, and an outlet through which the evaporated fluid is drawn. A series of fins of elongate aerofoil cross-section are located in and extend across the pathway in the flow direction of the waste fluid stream flowing along the pathway. The casing is curved and the fins are arranged parallel to a tangent of the curve.

12 Claims, 5 Drawing Sheets

OIL/WATER SEPARATION SYSTEM

The present invention relates to the treatment of industrial waste and more particularly to low pressure evaporation to treat oily dirty water.

The process of low pressure evaporation has been utilised within the waste industry for many years and has the particular advantage of being able to treat aqueous waste streams where the composition of these streams may vary from time to time. Other compositions to be treated may be in the form of emulsified materials, i.e. solvents and oils, that render chemical technologies and other physical separation methodologies ineffective.

Although low pressure evaporation technology is robust, the plant relies upon high pressure steam as an evaporative medium and, as the generation of the steam is relatively costly, such plants are expensive in operation.

The target waste to be treated, oily dirty water, is an oil emulsion waste generated by the oil re-refining industry where extreme variations in effluent exist and relatively large volumes of oily dirty water require treatment. The science utilised in the prior art technology is very basic in that the separation relies on water having a lower evaporative temperature than oil. Therefore the water evaporates preferentially to the oil bound in the waste stream when the waste is subjected to the appropriate thermal source. Oily dirty water arises from a variety of sources including refining of used lubricant oil, storm water, gullies from industrial sites and car parks, garage forecourts, tank cleaning procedures and ship bilges. Types of oil found in these waters range from the insoluble hydraulic oils, crude and bunker oils through to oils that contain entire packages of additives and others that contain detergents and soaps.

Generally the effluent will also contain traces of heavy metals, in particular lead, tin, zinc, silicon, iron and aluminium. In ionic form, these metals act as emulsifying agents known as hydrophilic colloids. General dirt, grit and sludge from the varied sources will be obvious to the naked eye and it is not uncommon to find a variety of solvents of various species.

The present invention is aimed at providing a more efficient way of separating oil and water.

According to the present invention there is provided an evaporator for use in industrial waste treatment comprising: a curved pathway bounded by a casing; an inlet port through which waste fluid enters the evaporator; a drain beneath the pathway through which a condensate passes, in use; an outlet through which to draw evaporated fluid; and a series of fins of elongate aerofoil cross-section in the intended flow direction around the pathway and extending across the pathway.

Preferably the pathway is substantially horizontal. The fins are preferably substantially vertical.

The fins may be arranged parallel to the tangent of the curve of the casing or, alternatively, and in particular if a large number of fins are present, they may be inclined at an angle to the linear flow line of the condensate, ideally at 12°, to reduce the effects of turbulence from the trailing edge of one fin affecting the flow over a subsequent fin.

The inlet port may be tangential and the drain may be conical. The inlet port may be provided with a throat portion which could be of reduced diameter, preferably about 10%, to increase the velocity of the fluid entering the evaporator.

The casing may be formed of a hydrophilic material, preferably a metal.

Furthermore, the curve of the pathway may trace one complete turn of a spiral.

The fins may have grooves to aid the condensate flow.

Preferably the evaporator will form part of an industrial waste water treatment plant.

The features of the present invention will now be further described with reference to the drawings in which.

Figure 1:
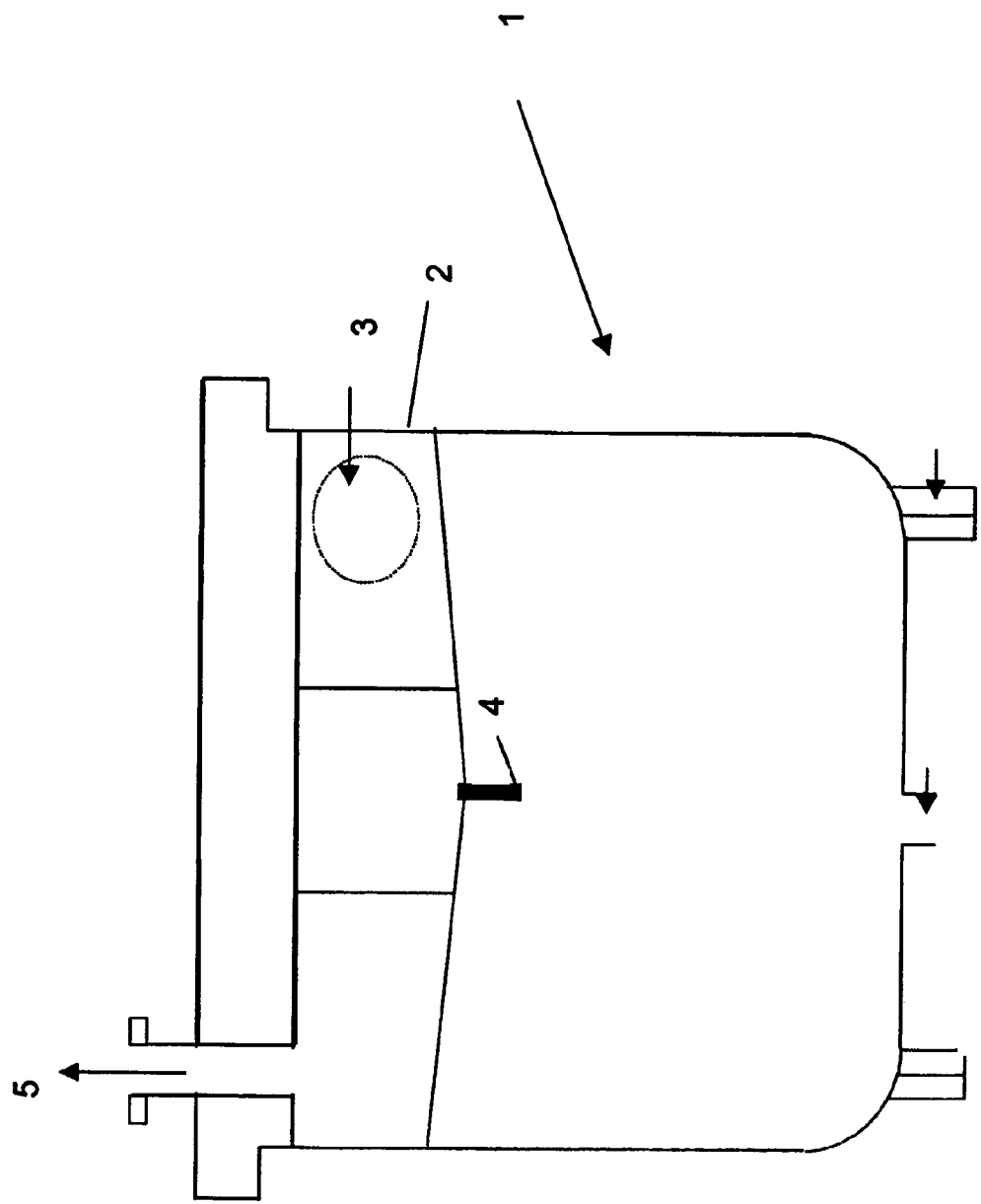
FIG. 1 shows a schematic side view of an evaporator according to the present invention.
Figure 2:
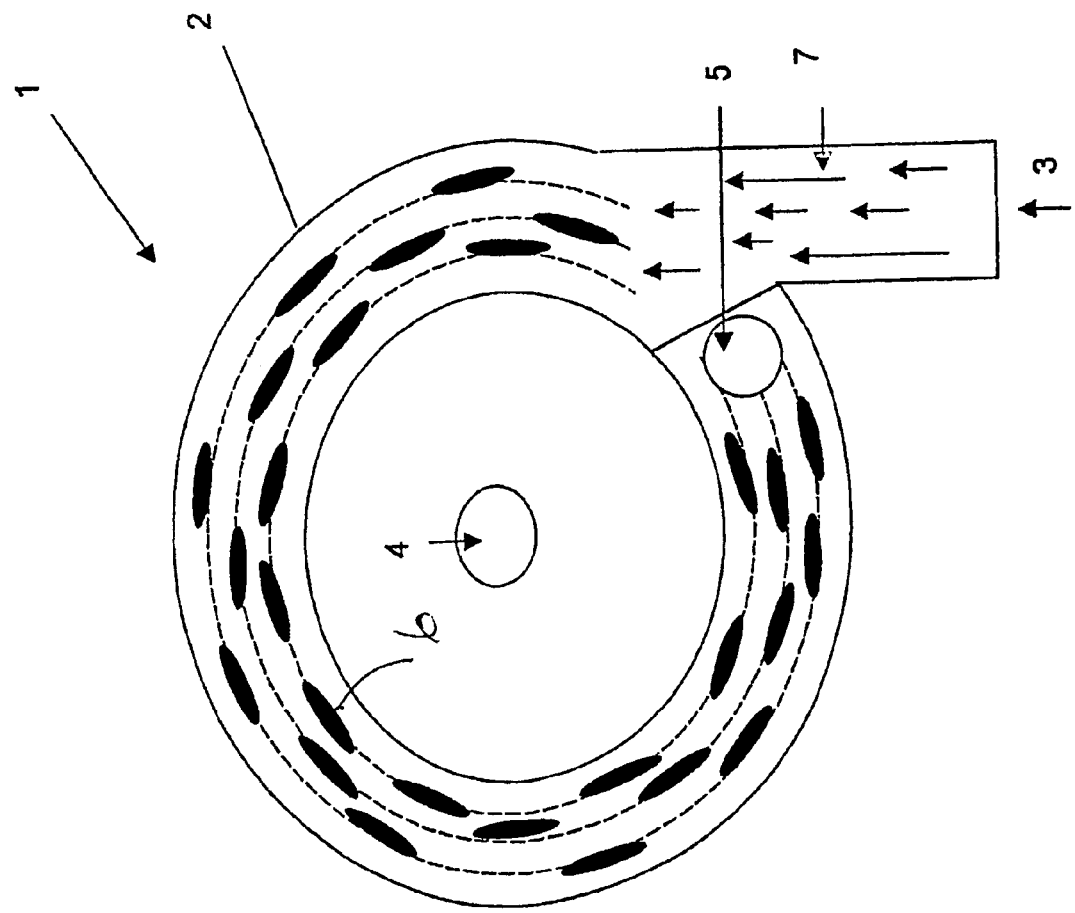
FIG. 2 shows a schematic plan view of an evaporator according to the present invention.

FIG. 1 shows an evaporator 1 according to the present invention. FIG. 2 shows a plan view of the same. The evaporator 1 comprises a shell 2, an inlet port 3, a drain 4 and an outlet 5. Within the shell 2 is a casing 12 enclosing a series of fins 6 which, in this example, extend substantially vertically within the casing 12. The fins 6 may be offset from vertical but the most efficient draining occurs when they are vertical. Preferably the distance between the trailing edge of one fin 6 and the leading edge of the next is 1.5 times the chord (the distance between the leading and trailing edges of a single fin) of the fin 6. Furthermore, in a preferred embodiment the length of the leading and trailing edges is twice the chord length of the fin 6. In use, the waste fluid 7 enters the evaporator 1 through the inlet port 3. The fluid 7 is a combination of water, steam and various oil products which may be more or less emulsified along with detergents, dissolved volatile organic compounds, dirt and grit. The fluid 7 is accelerated around a curved pathway 8 bounded by the casing 12. The velocity of the incoming fluid 7 may be increased by a narrowing of a throat portion (not shown) of the inlet port 3. The fins 6 are arranged in the pathway 8 to disrupt the fluid flow. As the movement of the fluid 7 is disrupted by the fins 6 various droplets condense onto the fins 6. These droplets are generally some of the larger oil droplets as well as water and some dissolved volatile organic compounds. Any droplets condensing onto the fins 6 then run down the fin 6 to pass through the drain 4. The pathway 8 traces approximately one turn of a spiral and the outlet 5 is positioned, in this example, vertically above the end of the pathway 8. The outlet 5 is evacuated by the provision of a vacuum pump (not shown) and draws the evaporated fluid out of the evaporator 1. The vacuum pump also draws the fluid 7 through the evaporator 1.

Figure 3:
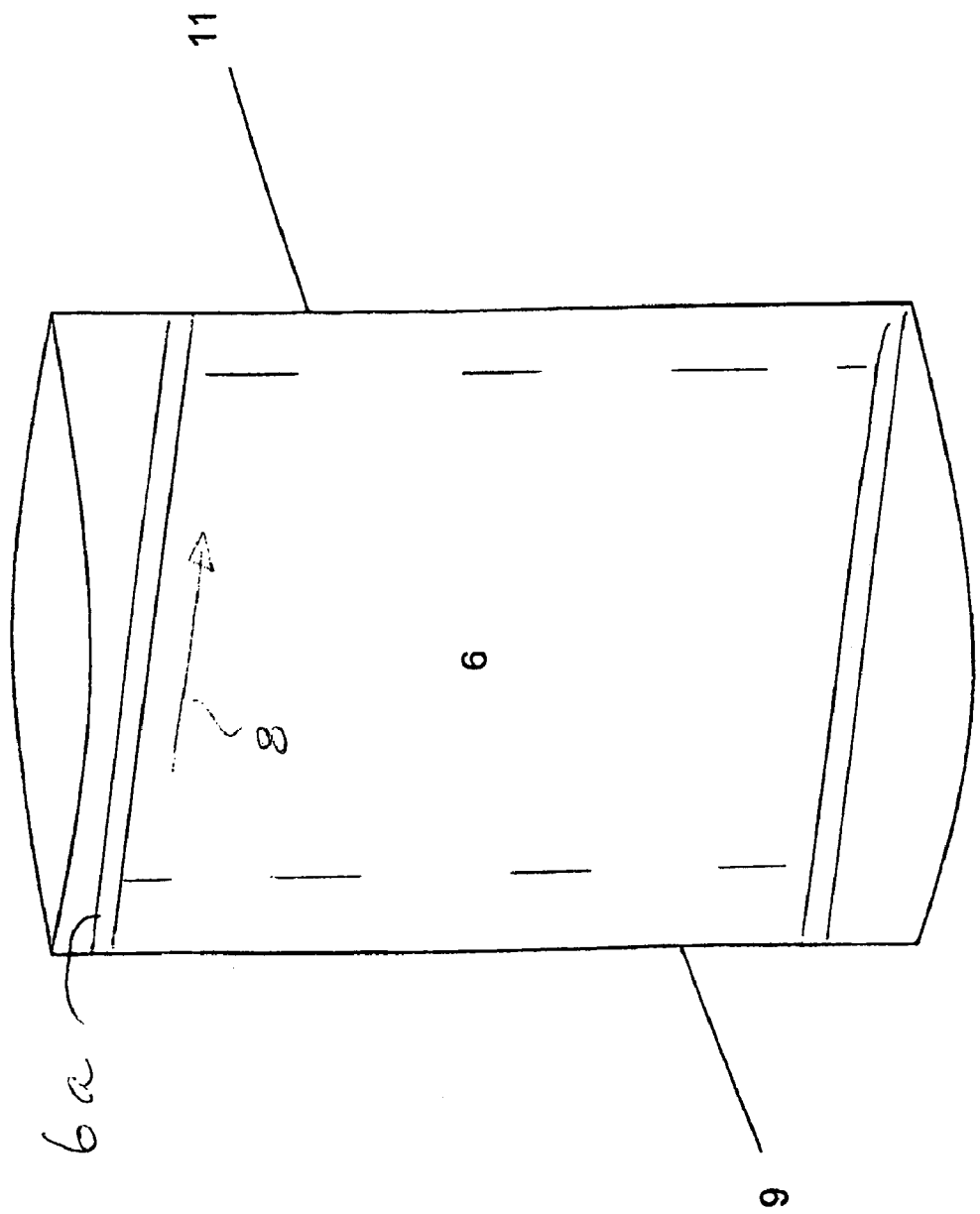
FIG. 3 shows a schematic side view of a fin.
Figure 4:
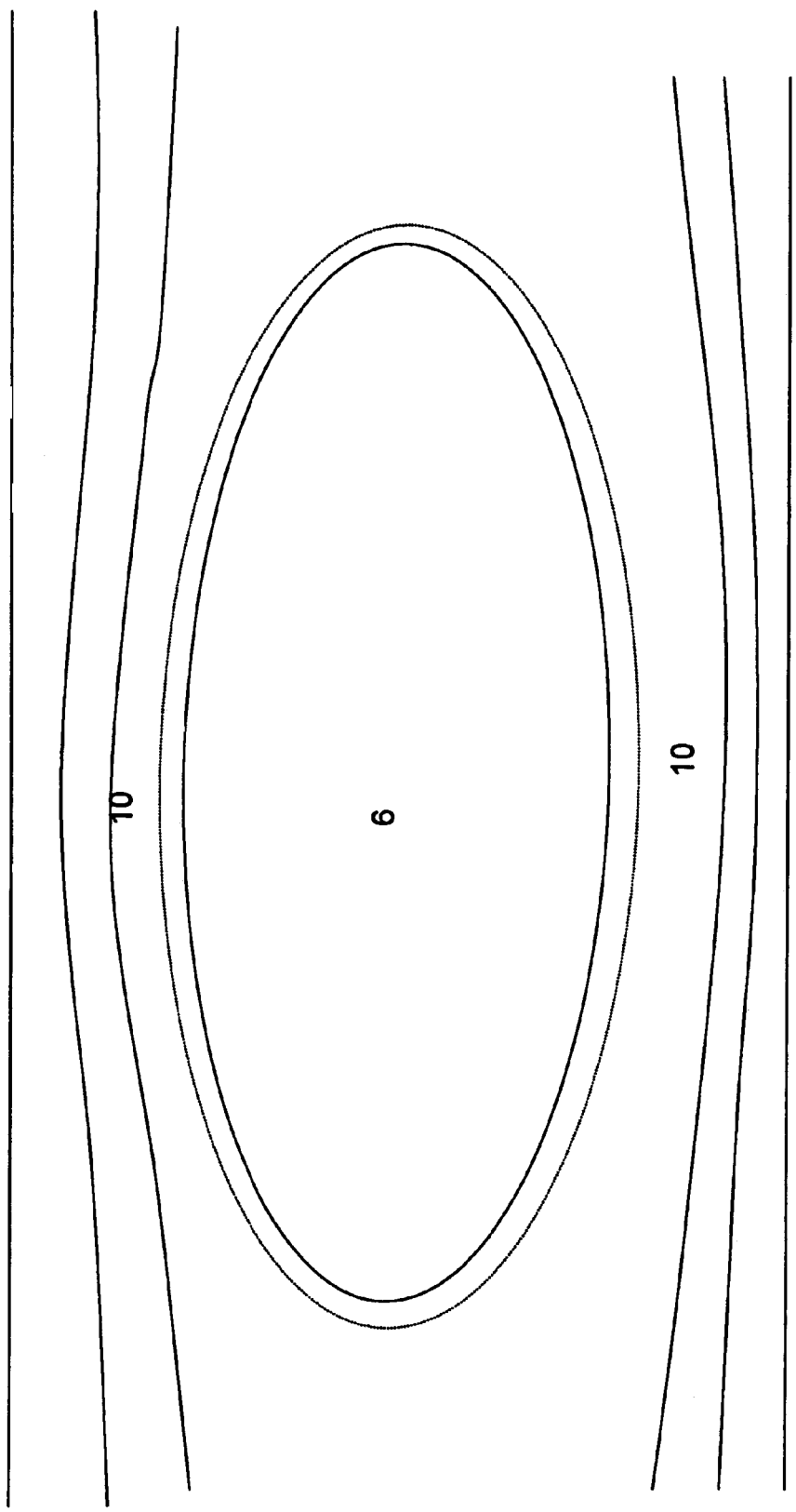
FIG. 4 shows a plan view of one section of the pathway within the evaporator and shows schematically the fluid flow around one fin.

Each of the fins 6 has an aerofoil cross-section and is illustrated in FIG. 3. When the fluid 7 comes into contact with the leading edge 9 of the fin 6, it is caused to stop momentarily and a stagnation point, at which the pressure is higher than anywhere else in the pathway 8, is formed. The fluid 7 must then deviate from its original path to avoid the fin.

As the fluid 7 passes around the fin 6, the regions of the fluid nearest to the fin try to maintain the same velocity as the bulk fluid, that is the fluid spaced from the fin. As the portions of the fluid nearest to the fin have to travel over a greater distance they are caused to accelerate thus forming low pressure regions on both sides of the fin 6.

A boundary layer, which is a relatively thin layer of substantially static fluid, is formed adjacent to the fin 6. The regions of low pressure 10 immediately outside the boundary layer cause the unwanted evaporative components to be drawn towards the fin, as they are heavier than wanter and usually have a lower evaporative point than water but ore of a hydrophilic nature, they adhere to the surface of the fin 6 and then run down the fin such that they pass thorough the drain 4.

the fluid 7, which is notw relieved of the unwanted evaporative component, is now less dense and therefore accelerates as it passes oveth rear section. Typically, there is a marginal temperature and pressure loss through the system.

The fins 6 may further be provided with grooves 6a in order to facilitate the passage of the condensate down the fins. The grooves 6a may run in spiral fashion leading down away from the leading edge 9 towards the trailing edge 11. in one example of the present invention there are 36 fins arranged in 3 rings of 12 fins although other configurations and numbers of fins can be arranged.

Figure 5:
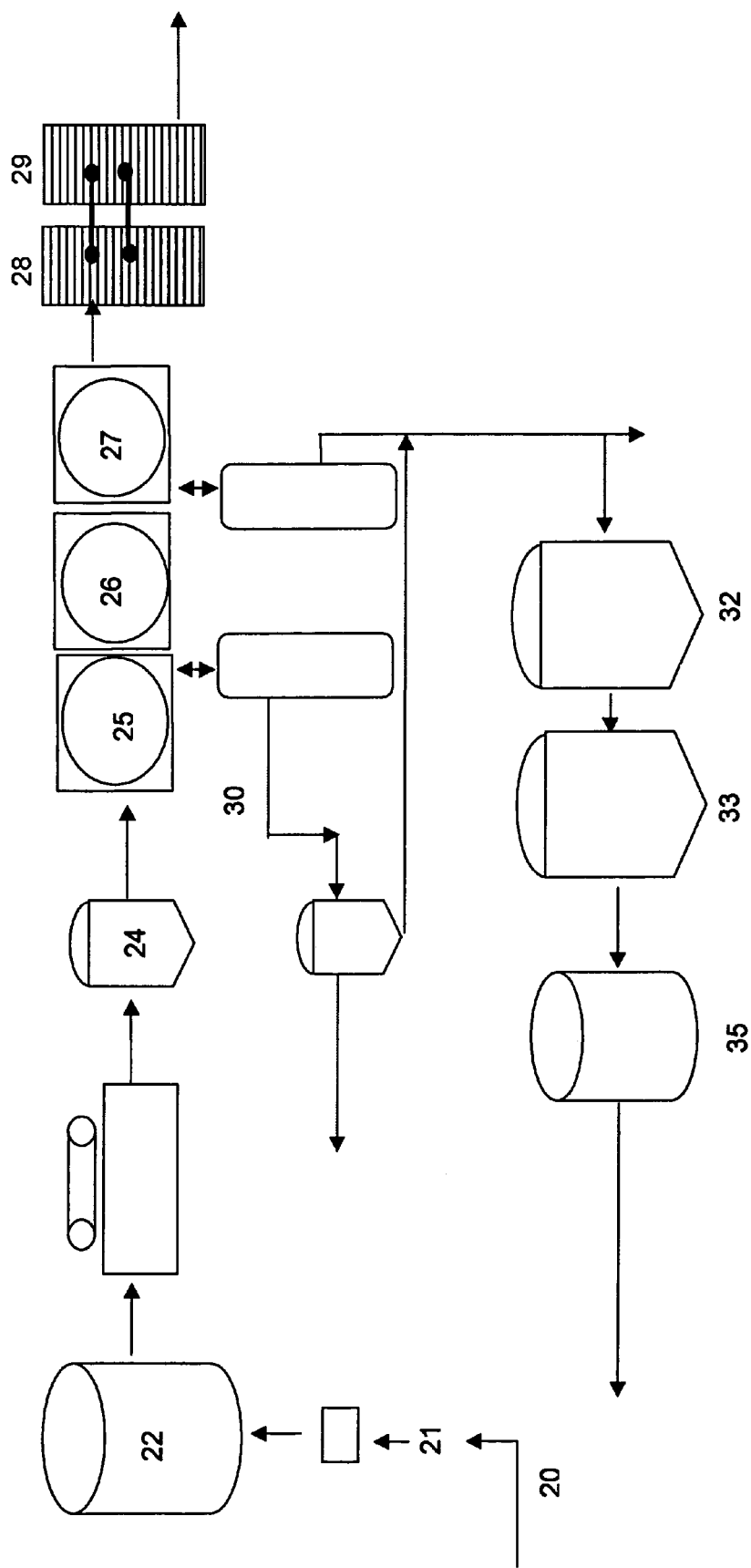
FIG. 5 shows three evaporators according to the present invention in a schematic representation of an industrial waste treatment plant.

FIG. 5 shows a schematic representation of a low pressure industrial waste treatment plant in which the evaporators of the present invention can be used. The fluid feed 20 enters the system from the client's holding tank (not shown) and passes through a series of basket filters 21 before it enters a feed storage tank 22. From there, the fluid passes through a paper band filter 23 which reduces the suspended solids to typically those smaller than 5 µm. The feed is then passed through a media bed 24 of KALPAC, which is a bentonite clay matrix which removes some of the free oil and volatile organic compounds and metals in ionic form.

Subsequent to the media bed 24 the feed enters a series of three low pressure vacuum evaporators 25, 26, 27 according to the present invention. The temperatures of the fluid in evaporators 25, 26 and 27 are typically 104° C., 84° C. and 64° C. respectively. The oil/water mix which leaves the evaporators is then collected in a tank and is fed to two scraped wall evaporators 28, 29 within which the fluid is further concentrated to approximately 80-90% oil. This can then be returned to the client for reuse within their processes.

The fluid which is removed from the evaporators 25, 26, 27 via outlets 5 is fed through heat exchangers and condensers 30 which ensure that the small amount of volatile organic compounds which will have escaped from the evaporators into fluid can be removed. The heat exchangers and condensers as shown are preferably disposed in an upright position with the channels of the heat exchanging elements disposed vertically, to enable easy cleaning of the elements. This fluid is then transferred to the polishing media which comprises two tanks 32, 33. Tank 32 comprises a bed formed from KALPAC which can absorb any hydrocarbon and volatile organic compounds which may remain in the bulk volume. This is then pumped through the second tank 33 containing a GAC matrix (carbon) as a safeguard prior to passing through an in line ultraviolet sterilisation unit (not shown). The bulk volume can then be stored in a holding tank 35 prior to being discharged or reused.

The invention claimed is:

1. An evaporator for receiving a waste fluid stream and producing therefrom separate streams of an evaporated fluid and a condensate liquid for use in industrial waste treatment comprising:

a curved pathway bounded by a casing having an inlet port through which in use the waste fluid enters the casing, said casing defining a pathway having a flow direction therein through which in use the waste fluid stream flows, and within which casing in use the evaporated fluid is separated from the waste fluid stream and producing the condensate liquid, said casing having a drain beneath the pathway through which in use the condensate liquid passes, and an outlet through which in use the evaporated fluid is drawn;

a series of fins of elongate aerofoil cross-section located in and extending across the pathway in the flow direction of the waste fluid stream flowing in use along the pathway and wherein the casing is curved and the fins are arranged parallel to a tangent of the curve of the casing.

2. An evaporator according to claim 1, wherein the pathway is substantially horizontal.

3. An evaporator according to claim 1, wherein the fins are substantially vertical.

4. An evaporator according to claim 1, wherein the casing is curved and the inlet port is tangential to the curve of the casing.

5. An evaporator according to claim 1, wherein the inlet port includes a narrowed throat portion.

6. An evaporator according to claim 1, wherein the drain is conical.

7. An evaporator according to claim 1, wherein the casing is formed of a hydrophilic material.

8. An evaporator according to claim 1, wherein the casing is metal.

9. An evaporator according to claim 1, wherein the curve of the pathway traces at least one complete turn of a spiral.

10. An evaporator according to claim 1, wherein the fins have an outer surface formed with grooves to aid the condensate liquid.

11. An evaporator according to claim 1, wherein the fins establish a pressure differential on each side thereof relative to the casing.

12. An industrial waste water treatment plant including at least one evaporator for receiving waste fluid stream and producing therefrom separate streams of an evaporated fluid and a condensate liquid comprising:

a curved pathway bounded by a casing having an inlet port through which in use the waste fluid stream enters, said casing defining a pathway having a flow direction therein through which in use the waste fluid stream flows, and within which casing in use the evaporated fluid is separated from the waste fluid stream and producing the condensate liquid, said casing having a drain beneath the pathway through which in use the condensate passes, and an outlet through which in use the evaporated fluid is drawn;

a series of fins of elongate aerofoil cross-section located in and extending across the pathway in the flow direction of the waste fluid stream; and wherein the casing is curved and the fins are arranged parallel to a tangent of the curve of the casing.

* * * * *